United States Patent
Yoshikawa et al.

(10) Patent No.: US 11,607,753 B2
(45) Date of Patent: Mar. 21, 2023

(54) SOLDER ALLOY, CAST ARTICLE, FORMED ARTICLE, AND SOLDER JOINT

(71) Applicant: SENJU METAL INDUSTRY CO., LTD., Tokyo (JP)

(72) Inventors: Shunsaku Yoshikawa, Tokyo (JP); Takashi Saito, Tokyo (JP); Takahiro Matsufuji, Tokyo (JP); Naoko Izumita, Tokyo (JP); Yuuki Iijima, Tokyo (JP); Kanta Dei, Tokyo (JP)

(73) Assignee: SENJU METAL INDUSTRY CO., LTD., Tokyo (JP)

( * ) Notice: Subject to any disclaimer, the term of this patent is extended or adjusted under 35 U.S.C. 154(b) by 0 days.

(21) Appl. No.: 17/603,500

(22) PCT Filed: Jun. 12, 2020

(86) PCT No.: PCT/JP2020/023190
§ 371 (c)(1),
(2) Date: Oct. 13, 2021

(87) PCT Pub. No.: WO2020/262040
PCT Pub. Date: Dec. 30, 2020

(65) Prior Publication Data
US 2022/0143761 A1  May 12, 2022

(30) Foreign Application Priority Data
Jun. 28, 2019 (JP) .............................. JP2019-121359

(51) Int. Cl.
*C22C 13/00* (2006.01)
*B23K 35/26* (2006.01)

(52) U.S. Cl.
CPC ............. *B23K 35/262* (2013.01); *C22C 13/00* (2013.01)

(58) Field of Classification Search
CPC ..................................................... C22C 13/00
See application file for complete search history.

(56) References Cited

U.S. PATENT DOCUMENTS

| 6,179,935 | B1   | 1/2001  | Yamashita et al. |
| 7,682,468 | B2 * | 3/2010  | Munekata ............ B23K 35/262 420/560 |
| 8,216,395 | B2 * | 7/2012  | Munekata ............ B23K 1/0016 420/560 |
| 8,227,536 | B2 * | 7/2012  | Watanabe ............... C22C 12/00 228/198 |
| 8,845,826 | B2 * | 9/2014  | Kawamata ............. C22C 13/00 148/400 |
| 9,527,167 | B2 * | 12/2016 | Ohnishi ............. B23K 35/0244 |
| 9,700,963 | B2 * | 7/2017  | Ohnishi .................. C22C 13/00 |
| 10,434,608 | B2 * | 10/2019 | Tachibana .......... B23K 35/0244 |
| 10,500,680 | B2 * | 12/2019 | Tachibana ............... C22C 13/02 |
| 10,717,158 | B2 * | 7/2020  | Saito ...................... C22C 13/02 |
| 10,780,530 | B2 * | 9/2020  | Oshima ................ B23K 35/262 |
| 10,780,531 | B2 * | 9/2020  | Kawasaki ......... H01L 23/49816 |
| 11,123,824 | B2 * | 9/2021  | Yokoyama ........... B23K 35/262 |
| 2003/0021718 | A1 | 1/2003 | Munekata et al. |
| 2004/0062679 | A1 | 4/2004 | Munekata et al. |
| 2008/0061117 | A1 | 3/2008 | Munekata et al. |
| 2008/0159903 | A1 | 7/2008 | Lewis et al. |
| 2008/0292492 | A1 | 11/2008 | Ingham et al. |
| 2009/0304545 | A1 | 12/2009 | Tanaka et al. |
| 2010/0297470 | A1 | 11/2010 | Munekata et al. |
| 2016/0107267 | A1 | 4/2016 | Ingham et al. |
| 2018/0361519 | A1 | 12/2018 | Tachibana et al. |
| 2020/0376606 | A1 | 12/2020 | Yokoyama et al. |
| 2020/0398382 | A1 * | 12/2020 | Sakamoto ............ B23K 35/262 |

FOREIGN PATENT DOCUMENTS

| CN | 101011782 A | 8/2007 |
| CN | 101132881 A | 2/2008 |
| CN | 101342642 A1 | 1/2009 |
| CN | 108941969 A | 12/2018 |
| EP | 1273384 A1 | 1/2003 |
| JP | 2001-191196 A | 7/2001 |
| JP | 2003-094195 A | 4/2003 |
| JP | 2008-521619 A | 6/2008 |
| JP | 2014-138065 A | 7/2014 |
| JP | 2017-196647 A | 11/2017 |
| JP | 2018-043264 A | 3/2018 |
| JP | 6369620 B1 | 8/2018 |

(Continued)

OTHER PUBLICATIONS

International Search Report dated Sep. 1, 2020 for the corresponding PCT International Patent Application No. PCT/JP2020/023190.
Written Opinion dated Sep. 1, 2020 for the corresponding PCT International Patent Application No. PCT/JP2020/023190.
Japanese Office Action dated Dec. 10, 2019 for the corresponding Japanese Patent Application No. 2019-121359.

(Continued)

*Primary Examiner* — Jophy S. Koshy
(74) *Attorney, Agent, or Firm* — Leason Ellis LLP; Melvin C. Garner; Mitsuhiro Haraguchi

(57) ABSTRACT

A solder alloy has an alloy composition consisting of, in mass %, Cu: 0.1% to 2.0%, Ni: 0.01% to 0.4%, P: 0.001% to 0.08%, and Ge: 0.001% to 0.08%, with the balance being Sn. The alloy composition satisfies the following relations (1) to (3): (Cu+5Ni)≤0.945% (relation (1)), (P+Ge)≤0.15% (relation (2)), 2.0≤(Cu+5Ni)/(P+Ge)≤1000 (relation (3)). In the above relations (1) to (3), Cu, Ni, P, and Ge each represents a content (mass %) thereof in the solder alloy.

8 Claims, 1 Drawing Sheet

(56) References Cited

FOREIGN PATENT DOCUMENTS

JP          2019-118930 A     7/2019

OTHER PUBLICATIONS

Chinese Office Action dated Feb. 9, 2022 for the corresponding Chinese Patent Application No. 202080029156.6.
Extended European Search Report dated Aug. 4, 2022 for the corresponding European Patent Application No. 20831263.7 (10 pages).

* cited by examiner

SOLDER ALLOY, CAST ARTICLE, FORMED ARTICLE, AND SOLDER JOINT

CROSS-REFERENCE TO RELATED PATENT APPLICATIONS

This application is a U.S. National Phase Application under 35 U.S.C. § 371 of International Patent Application No. PCT/JP2020/023190 filed on Jun. 12, 2020 and claims the benefit of priority to Japanese Patent Application No. 2019-121359 filed on Jun. 28, 2019, the contents of both of which are incorporated herein by reference in their entireties. The International Application was published in Japanese on Dec. 30, 2020 as International Publication No. WO/2020/262040 under PCT Article 21(2).

FIELD OF THE INVENTION

The present invention relates to a solder alloy suitable for casting, a cast product, a formed product, and a solder joint.

BACKGROUND OF THE INVENTION

Electronic components are mounted on a printed circuit board. Examples of a step of mounting the electronic components include flow soldering, dip soldering, and the like. The flow soldering is a method in which soldering is performed by applying a jet flow from a solder bath to a connection surface side of the printed circuit board. The dip soldering is a method in which an insertion component such as a coil component is inserted into a substrate, followed by immersing it in a solder bath to perform soldering. The dip soldering is selected as a method of removing an insulating film and performing pre-plating with a solder, as a pretreatment.

For the flow soldering or the dip soldering, a solder bath is required. Since the solder bath is exposed to the atmosphere for a long time, dross generated in the solder bath must be removed at regular intervals. Further, the molten solder in the solder bath is consumed by soldering. Therefore, a solder alloy is regularly supplied to the solder bath. For the supply of the solder alloy, a bar solder is generally used.

As a method for producing a bar solder, examples thereof include a casting method of pouring a molten solder into a fixed mold such as a sand mold or a metallic mold, and a continuous casting method of pouring a molten solder into a rotary mold. The continuous casting method is a method in which a raw material is added to a melting furnace and melted, and the molten solder in the melting furnace is cast into a groove of a rotary mold. Examples of the mold used in the continuous casting method include a mold having a shape in which a groove is provided at a central portion in a width direction of an annular plate. The molten solder solidifies after being cast into the groove of the rotary mold and is guided from the mold to a cutting step. The guided continuous cast product is cut so as to have a predetermined length to form a bar solder.

A technique relating to the continuous casting method of the solder alloy is disclosed in, for example, JP-A-2017-196647. This literature discloses that, in an Au—Sn based solder alloy, a chill through which cooling water flows is brought into close contact with the outside of the mold, the cooling rate up to 280° C. is 3° C./s or more, preferably 20° C./s or more, and more preferably 50° C./s or more, and the structure in an eutectic part is refined. However, although Au is sometimes used as a high-temperature Pb-free solder alloy, Au is expensive and difficult to be processed.

Therefore, an Sn—Cu based solder alloy is mainly used for the bar solder. It is common that the Sn—Cu based solder alloy forms intermetallic compounds in the solder alloy. However, since the continuous casting method is generally performed in the atmosphere, in a case where the Sn—Cu based solder alloy is cast as it is by the continuous casting method, the oxidation of the molten solder progresses due to oxygen in the atmosphere, the flowability of the molten solder decreases, and a desired cast product cannot be obtained. Form the viewpoint of preventing the oxidation of the Sn—Cu based solder alloy, JP-A-2003-94195 discloses an Sn—Cu—P—Ge—Ni solder alloy containing P and Ge. In the invention disclosed in JP-A-2003-94195, the upper limits of the contents of Cu and Ni are limited from the viewpoint of preventing an increase in liquidus temperature. This literature also discloses that, in a case where Ni is added in an amount equal to or more than the specific amount, there is a concern that the flowability of the molten solder is impaired. This literature further discloses that the addition of a large amount of P and Ge also increases the viscosity of the molten solder and impairs the flowability of the molten solder.

CITATION LIST

Patent Literature

Patent Literature 1: JP-A-2017-196647
Patent Literature 2: JP-A-2003-94195

Technical Problem

As described above, the invention disclosed in JP-A-2003-94195 is an excellent invention in which the flowability of the molten solder is taken into consideration. An object of the invention disclosed in JP-A-2003-94195 is to provide a solder alloy having improved solderability in an Sn—Cu-based lead-free solder alloy which is poor in wettability. When the flowability of the molten solder decreases, the soldering work becomes difficult. In order to solve this problem, the upper limits of all elements of Cu, Ni, P, and Ge are defined in this literature.

Here, the invention disclosed in JP-A-2003-94195 is said to solve a problem seen when mounting an electronic component on a printed circuit board by mainly flow soldering. In the flow soldering, it is assumed that the molten solder in the solder bath has proper wettability for the electronic components or electrodes of the substrate. Since a flux is used as an aid to facilitate the wettability in the electronic components or electrodes of the substrate for the flow soldering, the solder alloy used for the flow soldering is required to have high wettability. Therefore, in the invention disclosed in JP-A-2003-94195, the flowability of the molten solder is controlled in order to improve the wettability.

On the other hand, in the continuous casting method, when the molten solder has proper wettability for a rotary mold whose main component is Fe or Al, it is difficult for the solder alloy after solidification to be released from the rotary mold, so that it is assumed that the solder alloy does not have proper wettability for the rotary mold. Naturally, no flux is used in casting. The flowability of the molten solder required in the continuous casting method is controlled such that a cast product having a desired thickness can be obtained during solidification. Therefore, since the preconditions for controlling the flowability of the molten solder differ greatly between the flow soldering and the continuous casting method, an alloy design suitable for the continuous casting method is required in order to obtain a desired continuous cast product.

In addition, the amount of the molten solder used for the flow soldering is as large as several hundred kilograms. This is because, in the flow soldering, there is a concern that the temperature of the molten solder drops due to contact with the substrate transported by a belt conveyor or the like, and this is needed to be prevented. That is, the temperature drop of the molten solder in the flow soldering is prevented by making the heat capacity of the molten solder overwhelmingly larger than the heat capacity of the electronic component or the substrate. Therefore, it is not necessary to lower the liquidus temperature than necessary in the flow soldering.

On the other hand, in the continuous casting method, the amount of the solder supplied to the mold is tens to hundreds of grams, which is $1/1000$ or less as compared with that in the flow soldering. The heat capacity of the molten solder poured into the rotary mold is kept low by reducing the supply amount such that the temperature drop starts from the moment the molten solder comes into contact with the rotary mold and the molten solder solidifies. In a case where the liquidus temperature is too high, the molten solder solidifies at the moment of coming into contact with the mold, making it impossible to obtain a cast product having a desired thickness.

The solder alloy disclosed in JP-A-2003-94195 is suitable for the flow soldering as described above, but is not designed in consideration of the flowability and the liquidus temperature of the molten solder, which are required to be considered in the continuous casting method. Therefore, the solder alloy disclosed in JP-A-2003-94195 cannot be directly applied to the continuous casting method. Further, from the viewpoint of improving versatility, it is also required to obtain a desired cast product not only by a continuous casting method but also by a casting method using a fixed mold.

Therefore, an object of the present invention is to provide a solder alloy from which a cast product having a desired thickness can be obtained by casting, a cast product, a formed product, and a solder joint.

SUMMARY OF THE INVENTION

Solution to Problem

The present inventors has firstly examined the contents of Cu and Ni in the solder alloy disclosed in JP-A-2003-94195 in order to further prevent the increase in liquidus temperature. In a case where the contents of Cu and Ni are too large, the liquidus temperature rises. In addition to optimization of the respective contents of Cu and Ni in the continuous casting method, the present inventors have also focused on the total amount of Cu and Ni.

Next, the present inventors have controlled the contents of P and Ge in addition to the contents of Cu and Ni. As described above, JP-A-2003-94195 discloses that in the case where the contents of P and Ge are too large, the viscosity of the molten solder increases and the flowability of the molten solder is impaired. However, this impairment factor is applied to the flow soldering but is not always applied to casting. Therefore, the present inventors have considered that the flowability of the molten solder suitable for casting cannot be obtained by only controlling respective contents, and have also focused on the total amount of P and Ge.

As described above, the present inventors have independently examined the group of Cu and Ni and the group of P and Ge. However, in practice, in order to obtain the liquidus temperature of the solder alloy suitable for casting, it is necessary to perform the alloy design by taking the interaction between the two groups into consideration.

Therefore, the present inventors have focused on the balance between the two groups and conducted a more detailed study. As a result, it has been found that when these groups satisfy the specific relations, the viscosity of the molten solder suitable for the casting method can be realized, and a cast product having a desired thickness can be obtained. Thus, the present invention has been completed.

The present invention achieved based on these findings is as follows.

(1) A solder alloy, having an alloy composition consisting of, in mass %: Cu: 0.1% to 2.0%; Ni: 0.01% to 0.4%; P: 0.001% to 0.08%; and Ge: 0.001% to 0.08%, with the balance being Sn, wherein the alloy composition satisfies the following relations (1) to (3).

| | |
|---|---|
| $(Cu + 5Ni) \leq 0.945\%$ | Relation (1) |
| $(P + Ge) + \leq 0.15\%$ | Relation (2) |
| $2.0 \leq (Cu + 5Ni) / (P + Ge) \leq 1000$ | Relation (3) |

In the above relations (1) to (3), Cu, Ni, P, and Ge each represents a content (mass %) thereof in the solder alloy.

(2) The solder alloy according to the above (1), wherein the alloy composition further contains at least one selected from at least one group of: the group consisting of at least one of Bi, In, Zn, and Ag in a total amount of 5% or less; and the group consisting of at least one of Mn, Cr, Co, Fe, Si, Ti, and rare earth elements in a total amount of 1% or less.

(3) A cast product comprising the solder alloy according to the above (1) or (2).

(4) A formed product, formed from the cast product according to the above (3).

(5) A solder joint, obtained by using the cast product according to the above (3).

DETAILED DESCRIPTION OF THE INVENTION

Figure 1:
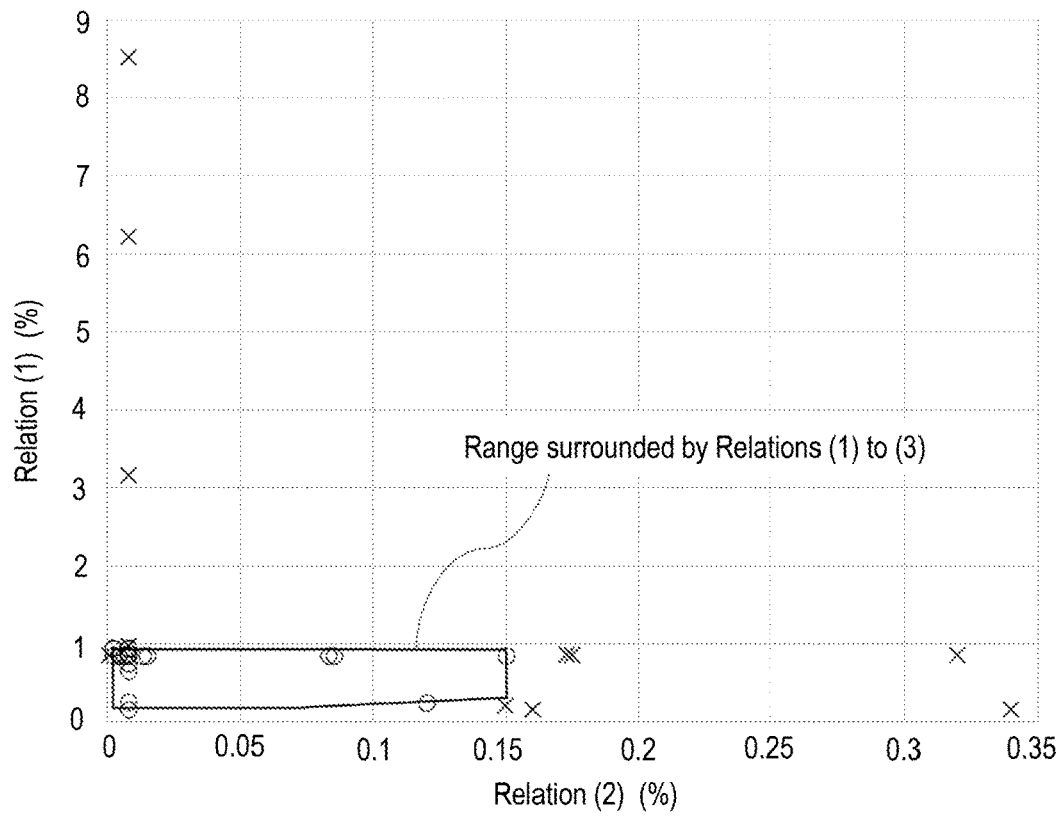
FIG. 1 is a diagram showing the range of the present invention in which the relation (2) is taken as the x-axis and the relation (1) is taken as the y-axis.

The present invention is described in more detail below. In the description, "%" related to a solder alloy composition is "mass %", unless otherwise specified.

1. Solder Alloy (1) Cu: 0.1% to 2.0%, and Ni: 0.01% to 0.4%

Cu and Ni are essential elements which can contribute to control of the liquidus temperature of the solder alloy. In the case where both contents of Cu and Ni are within the above range, the flowability of the molten solder is optimized, so that a cast product having a desired thickness can be obtained. In terms of the lower limit, the content of Cu is 0.1% or more, preferably 0.14% or more, more preferably 0.5% or more, and still more preferably 0.6% or more. In terms of the lower limit, the content of Ni is 0.01% or more, preferably 0.02% or more, and more preferably 0.03% or more. On the other hand, in the case where at least one of the content of Cu and the content of Ni is more than the corresponding upper limit, the liquidus temperature rises and the flowability decreases. In terms of the upper limit, the content of Cu is 2.0% or less, preferably 1.0% or less, more preferably 0.89% or less, and still more preferably 0.75% or less. In terms of the upper limit, the content of Ni is 0.4% or less, preferably 0.1% or less, more preferably 0.07% or less, and still more preferably 0.055% or less.

(2) P: 0.001% to 0.08%, and Ge: 0.001% to 0.08%

P and Ge are essential elements which can contribute to prevention of the oxidation of the solder alloy and control of the flowability of the molten solder. In the case where at least one of the content of P and the content of Ge is less than 0.001%, the oxidation prevention effect cannot be obtained. In terms of the lower limit, the content of P is 0.001% or more, and preferably 0.002% or more. In terms of the lower limit, the content of Ge is 0.001% or more, and preferably 0.003% or more. On the other hand, in the case where at least one of the content of P and the content of Ge is more than 0.08%, the decrease in flowability due to the oxidation of Sn is prevented, but the liquidus temperature becomes high. In terms of the upper limit, the content of P is 0.08% or less, preferably 0.06% or less, more preferably 0.01% or less, still more preferably 0.005% or less, and particularly preferably 0.003% or less. In terms of the upper limit, the content of Ge is 0.08% or less, preferably 0.07% or less, more preferably 0.06% or less, still more preferably 0.01% or less, particularly preferably 0.007% or less, and most preferably 0.005% or less.

(3) Relations (1) to (3)

$$(Cu + 5Ni) \leq 0.945\% \quad \text{Relation (1)}$$

$$(P + Ge) \leq 0.15\% \quad \text{Relation (2)}$$

$$2.0 \leq (Cu + 5Ni)/(P + Ge) \leq 1000 \quad \text{Relation (3)}$$

In the relations (1) to (3), Cu, Ni, P, and Ge each represents a content (%) thereof in the solder alloy.

As described above, each essential element of the solder alloy in the present invention has an optimum content for controlling the liquidus temperature of the solder alloy and the flowability of the molten solder. The content of each of the above essential elements is determined in order to prevent the decrease in flowability of the molten solder. The factors by which respective elements can control the flowability of the molten solder are different. When the constituent elements other than Sn are classified into element groups exhibiting similar effects and each group is made to satisfy the above relations (1) to (3), the solder alloy in the present invention having excellent castability can be obtained. Each relation is described in detail.

(3-1) Relation (1)

The relation (1) represents the balance of Cu and Ni in the solder alloy. As described above, Cu and Ni are elements which can control the liquidus temperature. In addition, since the contents of both elements determine the precipitation amount of the compound produced during solidification, it is important to control the total amount of both elements in order to optimize the flowability of the molten solder.

In the solder alloy in the present invention, in the case where the relation (1) is more than 0.945%, the liquidus temperature rises. Even in the case where the relation (1) is more than 0.945%, it is within an allowable range for flow soldering. However, in order to produce a desired cast product, in terms of the upper limit, the relation (1) needs to be 0.945% or less. The relation (1) is preferably 0.940% or less, and more preferably 0.875% or less. The lower limit of the left side of the relation (1) is not particularly limited, and the left side of the relation (1) is preferably 0.150% or more, more preferably 0.240% or more, still more preferably 0.250% or more, even more preferably 0.650% or more, particularly preferably 0.750% or more, and most preferably 0.850% or more.

(3-2) Relation (2)

The relation (2) represents the total amount of P and Ge in the solder alloy. Both elements can control the flowability of the molten solder by preventing oxidation. Since the reaction rates in the atmosphere are different between these elements, it is important to control the total amount of both elements in order to optimize the flowability of the molten solder.

In the solder alloy in the present invention, in the case where the left side of the relation (2) is more than 0.15%, the liquidus temperature of the solder alloy rises. In terms of the upper limit, the relation (2) is 0.15% or less, preferably 0.12 or less, more preferably 0.085% or less, still more preferably 0.083% or less, even more preferably 0.050% or less, particularly preferably 0.015% or less, and most preferably 0.013% or less. The lower limit of the relation (2) is not particularly limited, and the relation (2) is preferably 0.002% or more, more preferably 0.004% or more, still more preferably 0.006% or more, and particularly preferably 0.008% or more.

(3-3) Relation (3)

The relation (3) represents the balance between the group of Cu and Ni and the group of P and Ge in the solder alloy. Although the elements belonging to each group have different factors for controlling the viscosity of the molten solder, it is considered that the two groups interact with each other in determining the viscosity of the molten solder. Therefore, in order to control the viscosity of the molten solder, the balance between the above two groups is necessary to be taken into consideration.

In the solder alloy in the present invention, in the case where the relation (3) is less than 2.0, even if the contents of Cu and Ni are optimal, the content of P and Ge is too large and the liquidus temperature of the solder rises. In terms of the lower limit, the relation (3) is 2.0 or more, preferably 5.67 or more, more preferably 10.00 or more, still more preferably 10.24 or more, even more preferably 18.75 or more, particularly preferably 31.25 or more, and most preferably 56.67 or more. Further, in terms of the lower limit, the relation (3) may be 65.38 or more, 81.25 or more, 93.75 or more, or 106.25 or more.

On the other hand, in the case where the relation (3) is more than 1000, even if the contents of Cu and Ni are optimum, the contents of P and Ge are too small, so that Sn in the molten solder is oxidized and the flowability of the molten solder decreases. In addition, even if the contents of P and Ge are optimal, the contents of Cu and Ni are too large, so that the liquidus temperature of the solder alloy rises, the viscosity increases too much, and the flowability of the molten solder decreases, making it impossible to perform casting. In terms of the upper limit, the relation (3) is 1000 or less, preferably 472.5 or less, more preferably 470.00 or less, still more preferably 425.00 or less, even more preferably 212.50 or less, particularly preferably 141.67 or less, and most preferably 118.13 or less. The relation (3) may be 117.50 or less, or 109.38 or less.

(4) At least one selected from at least one group of: the group consisting of at least one of Bi, In, Sb, Zn, and Ag in a total amount of 5% or less; and the group consisting of at least one of Mn, Cr, Co, Fe, Si, Ti, and rare earth elements in a total amount of 1% or less With regard to these elements, as long as the total amount of at least one of Bi, In, Sb, Zn, and Ag is 5% or less and the total amount of at least one of Mn, Cr, Co, Fe, Si, Ti, and a rare earth elements is 1% or less, the castability of the solder alloy in the present invention is not influenced. In the present invention, the term "rare earth element" refers to 17 kinds of elements which are Sc and Y, belonging to Group 3, and 15 elements of the lanthanum group corresponding to the atomic numbers 57 to 71 in the periodic table.

In the present invention, at least one of Bi, In, Sb, Zn, Ag, Mn, Cr, Co, Fe, Si, Ti, and a rare earth element may be contained. With regard to the content of each element, the total amount of at least one of Bi, In, Sb, Zn, and Ag is preferably 5% or less, and the total amount of at least one of Mn, Cr, Co, Fe, Si, Ti, and a rare earth element is preferably 1% or less. The total amount of at least one of Bi, In, Sb, Zn, and Ag is more preferably 1% or less, and the total amount of at least one of Mn, Cr, Co, Fe, Si, Ti, and a rare earth element is more preferably 0.5% or less.

(5) Balance: Sn

The balance of the solder alloy in the present invention is Sn. In addition to the above elements, inevitable impurities may be contained. Even in the case where inevitable impurities are contained, the effects described above are not influenced. Further, as described below, even when an element not contained in the present invention is contained as an inevitable impurity, the effect described above is not influenced.

(6) Al

The solder alloy in the present invention should not contain Al in order to avoid deterioration of wettability due to oxidation.

2. Cast Product

Because the cast product in the present invention has an alloy composition of the solder alloy in the present invention, the cast product has a desired thickness. Examples of the cast product include a bar solder obtained by cut to have a predetermined length, as described below.

3. Formed Product

A formed product in the present invention is a product formed from the cast product in the present invention. For example, examples thereof include a wire solder, a flux-cored solder, or a ring-shaped or tubular solder, each obtained by processing the cast product. In addition to this, examples thereof also include a solder powder obtained by melting and spraying, and those formed into a solder ball.

4. Solder Joint

A solder joint in the present invention is formed by using the solder alloy in the present invention, and is used, for example, for connection between an IC chip and a substrate (interposer) thereof in a semiconductor package, or for connection between a semiconductor package and a printed circuit board.

5. Method for Producing Solder Alloy

As for the method for producing the solder alloy in the present invention, the solder alloy is produced by, for example, a continuous casting method. In the continuous casting method, first, raw materials are added to a melting furnace so as to have a predetermined alloy composition and heated to approximately 350° C. to 500° C. to melt the raw materials.

After all of the raw materials are melted, the molten solder in the melting furnace is continuously cast into the rotary mold.

The rotary mold has, for example, a shape in which a groove is provided at the central portion in a width direction of the annular plate. When the molten solder is cast, the molten solder is cast into the groove of the mold while rotating the rotary mold. The amount of the molten solder supplied to the mold is appropriately adjusted depending on the rotation speed of the mold.

The molten solder cast into the mold is cooled to approximately 150° C. at a cooling rate of about 10° C./s to 50° C./s. In order to obtain the cooling rate, the bottom of the rotary mold is immersed in cooling water, or the cooling water is circulated in the mold using a chiller or the like.

The cooled solder alloy is guided to the outside of the mold via the guide, and is cut to have a predetermined length. The solder alloy reaching the guide has been cooled to approximately 80° C. to 200° C. In the solder alloy of the present invention, since the viscosity of the molten solder is controlled, a continuous cast product having a desired thickness can be produced.

The casting method using a fixed mold may be a method in the related art. For example, raw materials are melted so as to have a predetermined alloy composition in the same manner as described above, then poured into a fixed mold and cooled at the above cooling rate. After cooling, the solder alloy can be produced by taking out the solder alloy from the mold.

EXAMPLES (1) Preparation of Evaluation Sample

In order to demonstrate the effects of the present invention, a bar solder was prepared and evaluated as follows. Raw materials were weighed and added to a melting furnace, and melted in the melting furnace whose temperature was set to 450° C., and then molten solder was cast into the grooves of the rotary mold through which water was circulated. The cooling rate was approximately 30° C./s.

The continuous cast product was then guided from the rotary mold to the outside of the rotary mold. Then, the continuous cast product was cut to have an appropriate length, and bar solders were prepared so as to have a total length of 10 m including a bar solder having a width of 10 mm and a length of 300 mm. The evaluation method is described below.

(2) Evaluation Method

The thickness of the prepared bar solder was measured with a caliper. The case where all the bar solders fell within the range of 7 mm±1 mm was evaluated as "○", and the case where at least one of the bar solders did not fall within the above range was evaluated as "X". For "○", there is no problem in practical use.

TABLE 1

| | Alloy composition (mass%) | | | | | | Relation (1) (%) | Relation (2) (%) | Relation (3) (%) | Thickness of bar solder |
|---|---|---|---|---|---|---|---|---|---|---|
| | Sn | Cu | Ni | P | Ge | Optional element | | | | |
| Example 1 | Bal. | 0.1 | 0.03 | 0.003 | 0.005 | | 0.250 | 0.008 | 31.25 | ○ |
| Example 2 | Bal. | 0.6 | 0.03 | 0.003 | 0.005 | | 0.750 | 0.008 | 93.75 | ○ |
| Example 3 | Bal. | 0.7 | 0.03 | 0.003 | 0.005 | | 0.850 | 0.008 | 106.25 | ○ |
| Example 4 | Bal. | 0.89 | 0.01 | 0.003 | 0.005 | | 0.940 | 0.008 | 117.50 | ○ |
| Example 5 | Bal. | 0.6 | 0.01 | 0.003 | 0.005 | | 0.650 | 0.008 | 81.25 | ○ |
| Example 6 | Bal. | 0.6 | 0.055 | 0.003 | 0.005 | | 0.875 | 0.008 | 109.38 | ○ |
| Example 7 | Bal. | 0.1 | 0.169 | 0.003 | 0.005 | | 0.945 | 0.008 | 118.13 | ○ |
| Example 8 | Bal. | 0.7 | 0.03 | 0.001 | 0.005 | | 0.850 | 0.006 | 141.67 | ○ |
| Example 9 | Bal. | 0.7 | 0.03 | 0.01 | 0.005 | | 0.850 | 0.015 | 56.67 | ○ |
| Example 10 | Bal. | 0.7 | 0.03 | 0.08 | 0.005 | | 0.850 | 0.085 | 10.00 | ○ |
| Example 11 | Bal. | 0.7 | 0.03 | 0.003 | 0.001 | | 0.850 | 0.004 | 212.50 | ○ |
| Example 12 | Bal. | 0.7 | 0.03 | 0.003 | 0.01 | | 0.850 | 0.013 | 65.38 | ○ |
| Example 13 | Bal. | 0.7 | 0.03 | 0.003 | 0.08 | | 0.850 | 0.083 | 10.24 | ○ |
| Example 14 | Bal. | 0.1 | 0.01 | 0.003 | 0.005 | | 0.150 | 0.008 | 18.75 | ○ |
| Example 15 | Bal. | 0.7 | 0.03 | 0.001 | 0.001 | | 0.850 | 0.002 | 425.00 | ○ |
| Example 16 | Bal. | 0.7 | 0.03 | 0.08 | 0.07 | | 0.850 | 0.15 | 5.67 | ○ |
| Example 17 | Bal. | 0.89 | 0.01 | 0.001 | 0.001 | | 0.940 | 0.002 | 470.00 | ○ |
| Example 18 | Bal. | 0.1 | 0.169 | 0.001 | 0.001 | | 0.945 | 0.002 | 472.50 | ○ |
| Example 19 | Bal. | 0.14 | 0.02 | 0.06 | 0.06 | | 0.240 | 0.12 | 2.00 | ○ |
| Example 20 | Bal. | 0.7 | 0.03 | 0.003 | 0.005 | Bi: 0.05 | 0.850 | 0.008 | 106.25 | ○ |
| Example 21 | Bal. | 0.7 | 0.03 | 0.003 | 0.005 | In: 0.05 | 0.850 | 0.008 | 106.25 | ○ |
| Example 22 | Bal. | 0.7 | 0.03 | 0.003 | 0.005 | Sb: 0.05 | 0.850 | 0.008 | 106.25 | ○ |
| Example 23 | Bal. | 0.7 | 0.03 | 0.003 | 0.005 | Zn: 0.05 | 0.850 | 0.008 | 106.25 | ○ |
| Example 24 | Bal. | 0.7 | 0.03 | 0.003 | 0.005 | Ag: 0.05 | 0.850 | 0.008 | 106.25 | ○ |
| Example 25 | Bal. | 0.7 | 0.03 | 0.003 | 0.005 | Mn: 0.01 | 0.850 | 0.008 | 106.25 | ○ |
| Example 26 | Bal. | 0.7 | 0.03 | 0.003 | 0.005 | Cr: 0.01 | 0.850 | 0.008 | 106.25 | ○ |
| Example 27 | Bal. | 0.7 | 0.03 | 0.003 | 0.005 | Co: 0.01 | 0.850 | 0.008 | 106.25 | ○ |
| Example 28 | Bal. | 0.7 | 0.03 | 0.003 | 0.005 | Fe: 0.03 | 0.850 | 0.008 | 106.25 | ○ |
| Example 28 | Bal. | 0.7 | 0.03 | 0.003 | 0.005 | Fe: 0.05 | 0.850 | 0.008 | 106.25 | ○ |
| Example 29 | Bal. | 0.7 | 0.03 | 0.003 | 0.005 | Si: 0.01 | 0.850 | 0.008 | 106.25 | ○ |
| Example 30 | Bal. | 0.7 | 0.03 | 0.003 | 0.005 | Ti: 0.01 | 0.850 | 0.008 | 106.25 | ○ |
| Example 31 | Bal. | 0.7 | 0.03 | 0.003 | 0.005 | Rare earth element: 0.01 | 0.850 | 0.008 | 106.25 | ○ |
| Comparative Example 1 | Bal. | 3 | 0.03 | 0.003 | 0.005 | | 3.150 | 0.008 | 393.75 | x |
| Comparative Example 2 | Bal. | 0.7 | 1.1 | 0.003 | 0.005 | | 6.200 | 0.008 | 775.00 | x |
| Comparative Example 3 | Bal. | 0.7 | 0.03 | 0.0003 | 0.005 | | 0.850 | 0.0053 | 160.38 | x |
| Comparative Example 4 | Bal. | 0.7 | 0.03 | 0.17 | 0.005 | | 0.850 | 0.175 | 4.86 | x |
| Comparative Example 5 | Bal. | 0.7 | 0.03 | 0.003 | 0.0005 | | 0.850 | 0.0035 | 242.86 | x |
| Comparative Example 6 | Bal. | 0.7 | 0.03 | 0.003 | 0.17 | | 0.850 | 0.173 | 4.91 | x |
| Comparative Example 7 | Bal. | 0.7 | 0.055 | 0.003 | 0.005 | | 0.975 | 0.008 | 121.88 | x |
| Comparative Example 8 | Bal. | 0.7 | 0.03 | 0.16 | 0.16 | | 0.850 | 0.320 | 2.66 | x |
| Comparative Example 9 | Bal. | 0.1 | 0.01 | 0.17 | 0.17 | | 0.150 | 0.340 | 0.44 | x |
| Comparative Example 10 | Bal. | 0.7 | 0.03 | 0.0003 | 0.0005 | | 0.850 | 0.0008 | 1062.50 | x |
| Comparative Example 11 | Bal. | 3 | 1.1 | 0.003 | 0.005 | | 8.500 | 0.008 | 1062.50 | x |
| Comparative Example 12 | Bal. | 0.1 | 0.02 | 0.08 | 0.07 | | 0.200 | 0.150 | 1.33 | x |

The underlined value means that the value is outside the range of the present invention.

As is clear from the results in Table 1, in each of Examples according to the present invention, a bar solder having a desired thickness could be obtained. On the other hand, since none of Comparative Examples satisfies at least one of the requirements of the present invention, a bar solder having a desired thickness could not be obtained. The fact that the content of each constituent element is necessary to satisfy the range of the present invention and the relations (1) to (3) are necessary to be satisfied is described with reference to the drawings.

Figure 2:
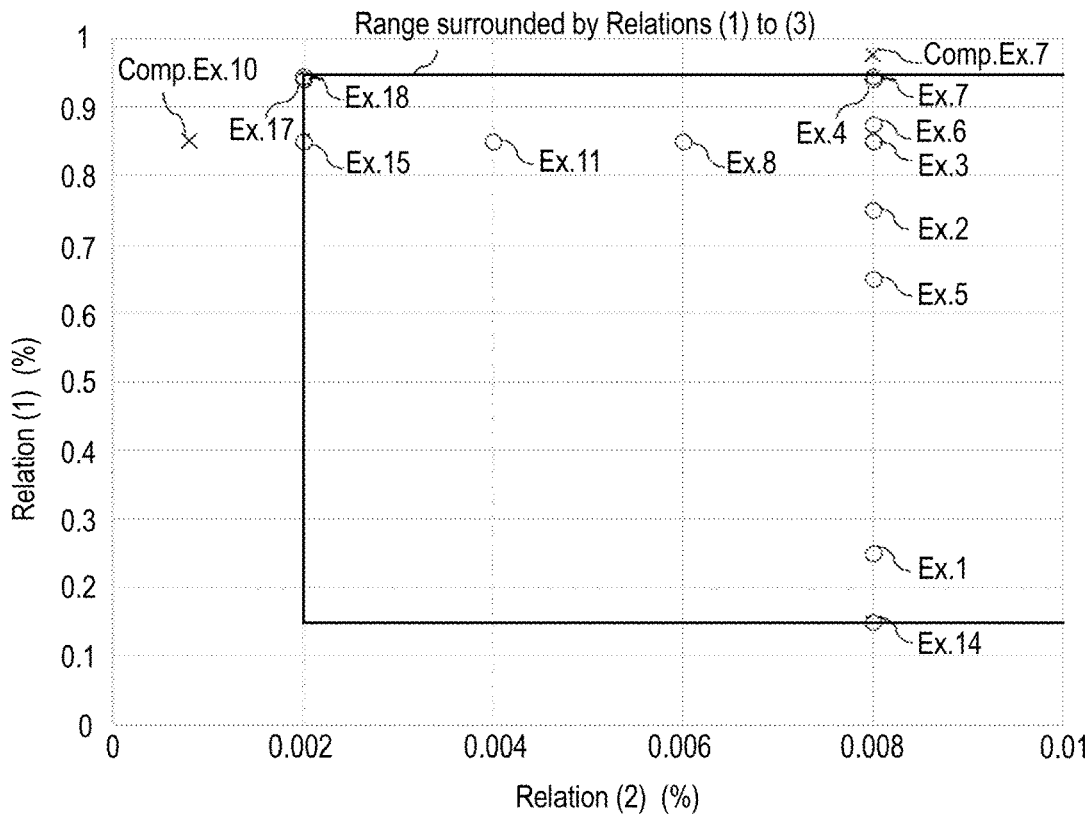
FIG. 2 is an enlarged view of FIG. 1 with the x-axis range being 0 to 0.01 and the y-axis range being 0 to 1.

FIG. 1 and FIG. 2 are diagrams showing extracted Examples satisfying the relations (1) to (3) and extracted Comparative Examples not satisfying at least one of the relations (1) to (3) in Table 1, in which the relation (2) is taken as the x-axis and the relation (1) is taken as the y-axis. FIG. 2 is an enlarged view of FIG. 1 with the x-axis range being 0 to 0.01 and the y-axis range being 0 to 1. In FIG. 1 and FIG. 2, "○" represents Example and "X" represents Comparative Example. Further, in FIG. 1 and FIG. 2, the region surrounded by the thick line is the range surrounded by the relations (1) to (3).

As is clear from FIG. 1 and FIG. 2, all the solder alloys falling within the range surrounded by the thick line have a desired thickness. On the other hand, as shown in FIG. 1, the Comparative Examples not satisfying any of the relations does not have a desired thickness. Particularly, as shown in FIG. 2, it becomes clear from Comparative Example 7 not satisfying only the relation (1) and Comparative Example 10 not satisfying the relation (3), that the desired thickness may not be obtained even if the value is slightly out of the range surrounded by the thick line.

The invention claimed is:

1. A solder alloy, having an alloy composition consisting of, in mass %:
Cu: 0.1% to 0.6%;
Ni: 0.01% to 0.4%;
P: 0.001% to 0.08%;
Ge: 0.001% to 0.08%; and
optionally at least one selected from the group consisting of Mn, Cr, Co, Si, Ti, and rare earth elements in a total amount of 1% or less,
with the balance being Sn, wherein
the alloy composition satisfies the following relations (1) to (3):

$$(Cu + 5Ni) \leq 0.945\% \quad \text{Relation (1)}$$

$$(P + Ge) \leq 0.15\% \quad \text{Relation (2)}$$

$$2.0 \leq (Cu + 5Ni)/(P + Ge) \leq 1000 \quad \text{Relation (3)}$$

wherein, in the above relations (1) to (3), Cu, Ni, P, and Ge each represents a content in mass % thereof in the solder alloy, and when the solder alloy is used to produce a bar solder having a width of 10 mm and a length of 300 mm, the thickness of the bar solder is within a range of 7 mm±1 mm.

2. The solder alloy according to claim 1, having the alloy composition consisting of, in mass %:
Cu: 0.1% to 0.6%;
Ni: 0.01% to 0.4%;
P: 0.001% to 0.08%; and
Ge: 0.001% to 0.08%, with the balance being Sn.

3. A cast product comprising the solder alloy according to claim 1.

4. A cast product comprising the solder alloy according to claim 2.

5. A formed product, formed from the cast product according to claim 3.

6. A solder joint, obtained from the cast product according to claim 3.

7. A formed product, formed from the cast product according to claim 4.

8. A solder joint, obtained from the cast product according to claim 6.

* * * * *